United States Patent [19]
Walker

[11] 3,963,196
[45] June 15, 1976

[54] AIRCRAFT/SPACECRAFT GROUND ACCELERATOR

[75] Inventor: William H. Walker, Bellevue, Wash.

[73] Assignee: The United States of America as represented by the Secretary of the Air Force, Washington, D.C.

[22] Filed: June 12, 1974

[21] Appl. No.: 478,551

[52] U.S. Cl.............................. 244/50; 152/310; 244/63
[51] Int. Cl.² .......................................... B64F 1/10
[58] Field of Search ............... 244/172, 2, 63, 50, 244/114 R, 116; 301/6 A, 86; 152/310, 322, 330; 188/5

[56] References Cited
UNITED STATES PATENTS

| | | | |
|---|---|---|---|
| 1,686,142 | 10/1928 | Bonsieur | 152/310 |
| 1,752,845 | 4/1930 | Hibbert | 152/317 |
| 2,774,557 | 12/1956 | Jakimiuk et al. | 244/63 |
| 2,877,969 | 3/1959 | Dowty | 188/5 |
| 2,921,756 | 1/1960 | Borden et al. | 244/2 |
| 2,922,602 | 1/1960 | Matheisel et al. | 244/63 |
| 3,208,497 | 9/1965 | Schutt | 152/313 |
| 3,210,029 | 10/1965 | Brusch et al. | 244/2 |
| 3,437,285 | 4/1969 | Manfredi et al. | 244/172 |

Primary Examiner—Trygve M. Blix
Assistant Examiner—Galen L. Barefoot
Attorney, Agent, or Firm—Joseph E. Rusz; Arsen Tashjian

[57] ABSTRACT

An accelerator including a framework having an aerodynamic fairing shaped to provide positive pitch and directional stability and including a support and attachment system for holding a fully fueled horizontal takeoff space vehicle such that the negative structure loadings are reduced to a minimum. The running gear system includes a plurality of wheel tire sets with braking and decelerating systems associated therewith.

1 Claim, 2 Drawing Figures

U.S. Patent   June 15, 1976   3,963,196

AIRCRAFT/SPACECRAFT GROUND ACCELERATOR

BACKGROUND OF THE INVENTION

This invention relates to a structure mounted on wheels for launching a spacecraft horizontally and, more particularly, the invention is concerned with providing a ground accelerator having multiple point support for the launch vehicle, ground mobility including power and steering.

Highly loaded spacecraft with a full fuel load when sitting on the ground in a horizontal position place unusual loadings on the structure concentrated at the landing gear attach points. Once airborne, these loadings are distributed throughout the structure. Thus, this ground loaded condition imposes a penalty on the structure not necessary for flight.

The landing gear must be designed for the maximum takeoff weight rather than the landing weight which, in the case of the single-stage-to-orbit space vehicle, is a ratio of approximately 10 to 1; this is a direct weight penalty on the landing gear and attach structure.

The accelerator requirements to achieve a safe takeoff speed within the constraints of runway length indicate a high thrust level desirability, higher than necessary for flight. This high thrust also requires a high fuel flow with a significant portion of the fuel capacity used before flight is achieved.

SUMMARY OF THE INVENTION

The present invention provides a ground accelerator which includes multiple point support for the launch vehicle, ground mobility including power and steering. In addition the ground accelerator incorporates a complete deceleration system to stop the accelerator after the airborne vehicle is launched.

Accordingly, it is an object of the invention to provide a ground accelerator which includes a framework for supporting an aerodynamic fairing shaped to provide positive pitch and directional stability throughout the normal range of attitudes and wind directions.

Another object of the invention is to provide a ground accelerator wherein the launch vehicle support and attachment system includes a multiple set of support points arranged to eliminate or reduce the negative vehicle structure loadings.

Still another object of the invention is to provide a launch vehicle ground accelerator having a running gear system which includes two forward and two aft wheel tire sets. Each set includes a hydraulically operated skid pad for braking. The two forward sets include a hydraulically operated steering system which steers the set in combination.

A further object of the invention is to provide a launch vehicle ground accelerator having a deceleration system which includes a metallic drogue parachute which is deployed immediately after the vehicle is launched to aid in stabilizing and decelerating the accelerator. The system also includes a pair of hydraulically operated drag flaps which perform the basic aero deceleration function while hydraulically operated skid plates perform the final deceleration and stop the accelerator.

A still further object of the invention is to provide a spacecraft ground accelerator which includes a self-contained auxiliary power unit which generates electrical and hydraulic power and the necessary control and distribution system for these systems and an avionics system which performs the guidance and control function for the accelerator, the checkout and systems monitoring function for both the accelerator and the launch vehicle, and the telemetry of this data to the launch vehicle cockpit and the launch blockhouse data display.

These and other objects, features, and advantages will become more apparent after considering the following description taken in conjunction with the annexed drawings and appended claims.

DESCRIPTION OF A PREFERRED EMBODIMENT

Figure 1:
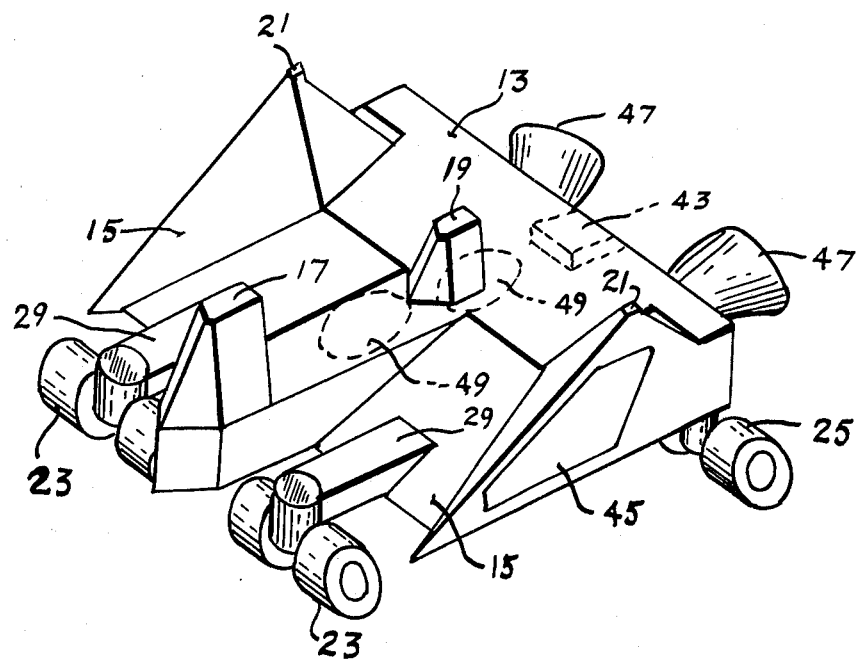
FIG. 1 is a view in perspective of an idealized version of a single-stage-to-orbit space vehicle ground accelerator showing the support pads and the negative lift surface fairings.

Referred now to the drawings, there is shown a spacecraft ground accelerator according to the invention including a framework 13 to which is attached an aerodynamic fairing 15 shaped to provide positive pitch and directional stability throughout the normal range of attitudes and wind directions. Also attached to the framework 13 is a launch vehicle support which includes a forward support pad 17 and an aft point 19. A pair of stabilizing pads 21 are disposed on the uppermost portion of the fairing 15 to provide further stability to the accelerator system. The multiple set of support points is constructed and arranged to eliminate or reduce the negative structure loadings.

A running gear system including two forward wheel/tire sets 23 and two aft wheel/tire sets 25 are attached to the framework 13 for effectively providing mobility to the accelerator and supporting the weight of the launch vehicle. Each set of wheel/tires 23 and 25 includes a hydraulically operated skid pad 27 (see FIG. 2) for braking. The forward sets 23 include a hydraulically operated steering system (not shown) which steers the set in combination. The two forward sets 23 are mounted on arms 29.

Figure 2:
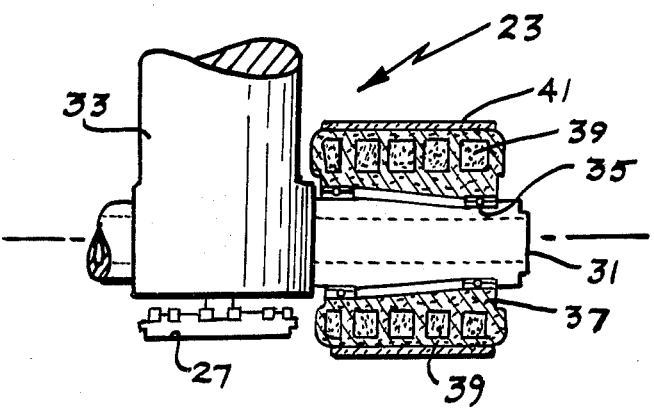
FIG. 2 is a detailed view in partial cross-section of one of the high load capability wheel/tires with the skid plate brake associated therewith for deceleration after launching.

In FIG. 2, there is shown a cross-sectional view of one wheel of the four sets of wheel/tires 23 and 25. Each of the sets 23, 25 rotate on an axle shaft 31 which is preferably fixedly attached to the upright member 33. Load bearings 35 serve to support the weight and reduce friction in the system. The wheel/tires are preferably constructed of a cast epoxy glass filled matrix 37 with silastic foam core elements 39 embedded therein between the axle shaft 31 and a tire tread 41 which is preferably fabricated of a plurality of radial/axial glass ply located to the glass filled epoxy matrix 37. Each of the high load capability wheel/tire sets 23 and 25 can be individually balanced by any suitable method including the injection of weighted material into the core elements at the proper locations.

A deceleration system includes a metallic drogue chute (not shown) which is stored in the compartment 43 for deployment immediately after the space vehicle is launched to aid in stabilizing and decelerating the accelerator. The system also includes a pair of hydraulically operated drag flaps which are stored in the area behind the drag brake panel 45 for performing the basic aero deceleration function and as noted above, the hydraulically operated skid plates 27 perform the final deceleration and stop the accelerator.

A self-contained auxiliary power unit is provided for generating electrical and hydraulic power and the necessary control and distribution apparatus for these power systems. Also, an avionics system which performs the guidance and control function for the accelerator, the checkout and systems monitoring function for both the accelerator and the launch vehicle, and the telemetry of this data to the launch vehicle cockpit and the launch blockhouse data display is included as part of the instrumentation on the accelerator. Two F-1 rocket engines 47 which are oriented to a thrust direction of 10 degrees up and 10 degrees out to reduce runway damage, provide the required ground accelerator thrust. The fuel/oxidizer tankage 49 along with the necessary plumbing and controls is installed on the accelerator for feeding the rocket engines 47.

Although the invention has been illustrated in the accompanying drawings and decribed in the foregoing application in terms of a preferred embodiment thereof, the invention is not limited to this embodiment or to the particular configuration mentioned. It will be apparent to those skilled in the art that other uses can be made of the hereinbefore described aircraft/spacecraft ground accelerator including a system of inertial guidance testing in missile development.

Having thus set forth and described the nature of my invention, what I claim and desire to secure by Letters Patent of the United States is:

1. A ground accelerator for supporting and accelerating a fully loaded space vehicle mounted thereon along a runway prior to launching, said accelerator comprising a framework of generally rectangular shape, a aerodynamic fairing attached to said framework for providing positive pitch and directional stability to the accelerator, a plurality of support pads on the upper side of said framework for mounting the space vehicle to the ground accelerator, said plurality of support pads including a forward support pad for supporting the forward portion of the space vehicle, an aft support pad for supporting the aft section of the space vehicle, and a pair of stabilizing pads, one each positioned on the upper side edges of the accelerator to provide further support for the space vehicle, a plurality of wheel/tires positioned at each corner of the accelerator in contact with the runway surface for supporting the accelerator and providing mobility thereto, said plurality of wheel/tires including a pair of forward sets positioned one set at each forward corner of the accelerator, and a pair of aft sets each positioned at each rearward corner of the accelerator, each of said wheel/tires including an epoxy glass filled matrix with silastic foam core elements embedded therein and a tire tread around the outer circumferential surface thereof, means for accelerating the ground accelerator along the runway to reach a predetermined critical speed.

* * * * *